(12) United States Patent
Oyama et al.

(10) Patent No.: US 10,685,534 B2
(45) Date of Patent: Jun. 16, 2020

(54) INFORMATION PROCESSING SYSTEM

(71) Applicant: Universal Entertainment Corporation, Tokyo (JP)

(72) Inventors: Masaki Oyama, Tokyo (JP); Atsushi Kumita, Tokyo (JP); Toshikazu Jinnouchi, Tokyo (JP)

(73) Assignee: Universal Entertainment Corporation, Koto-ku (JP)

( * ) Notice: Subject to any disclaimer, the term of this patent is extended or adjusted under 35 U.S.C. 154(b) by 0 days.

(21) Appl. No.: 16/141,017

(22) Filed: Sep. 25, 2018

(65) Prior Publication Data
US 2019/0096159 A1    Mar. 28, 2019

(30) Foreign Application Priority Data

Sep. 27, 2017 (JP) ................. 2017-187123

(51) Int. Cl.
| | |
|---|---|
| G07F 17/32 | (2006.01) |
| A63F 13/35 | (2014.01) |
| A63F 13/50 | (2014.01) |
| A63F 13/45 | (2014.01) |
| A63F 13/46 | (2014.01) |

(52) U.S. Cl.
CPC ............ *G07F 17/323* (2013.01); *A63F 13/35* (2014.09); *A63F 13/45* (2014.09); *A63F 13/46* (2014.09); *A63F 13/50* (2014.09); *G07F 17/3211* (2013.01)

(58) Field of Classification Search
USPC ................. 463/1, 20, 22, 25, 30, 39, 40
See application file for complete search history.

(56) References Cited

U.S. PATENT DOCUMENTS

| | | | |
|---|---|---|---|
| 8,287,367 B2* | 10/2012 | Hall | G07F 17/32 463/29 |
| 2002/0119824 A1* | 8/2002 | Allen | A63F 13/12 463/42 |
| 2007/0275777 A1* | 11/2007 | Walker | G07F 17/3227 463/16 |
| 2014/0094280 A1* | 4/2014 | Berman | G07F 17/326 463/25 |

\* cited by examiner

*Primary Examiner* — Adetokunbo O Torimiro
(74) *Attorney, Agent, or Firm* — Simpson & Simpson, PLLC; S. Peter Konzel, Esq.

(57) ABSTRACT

A server of an information processing system includes a controller which is configured to calculate points corresponding to a particular prize when a game result received from information processors is the particular prize, and a memory which is configured to accumulatively store the points calculated by the controller. The controller sends a special prize to the information processor when the number of the points stored in the memory for the at least one of the information processors is equal to or larger than a predetermined number.

6 Claims, 10 Drawing Sheets

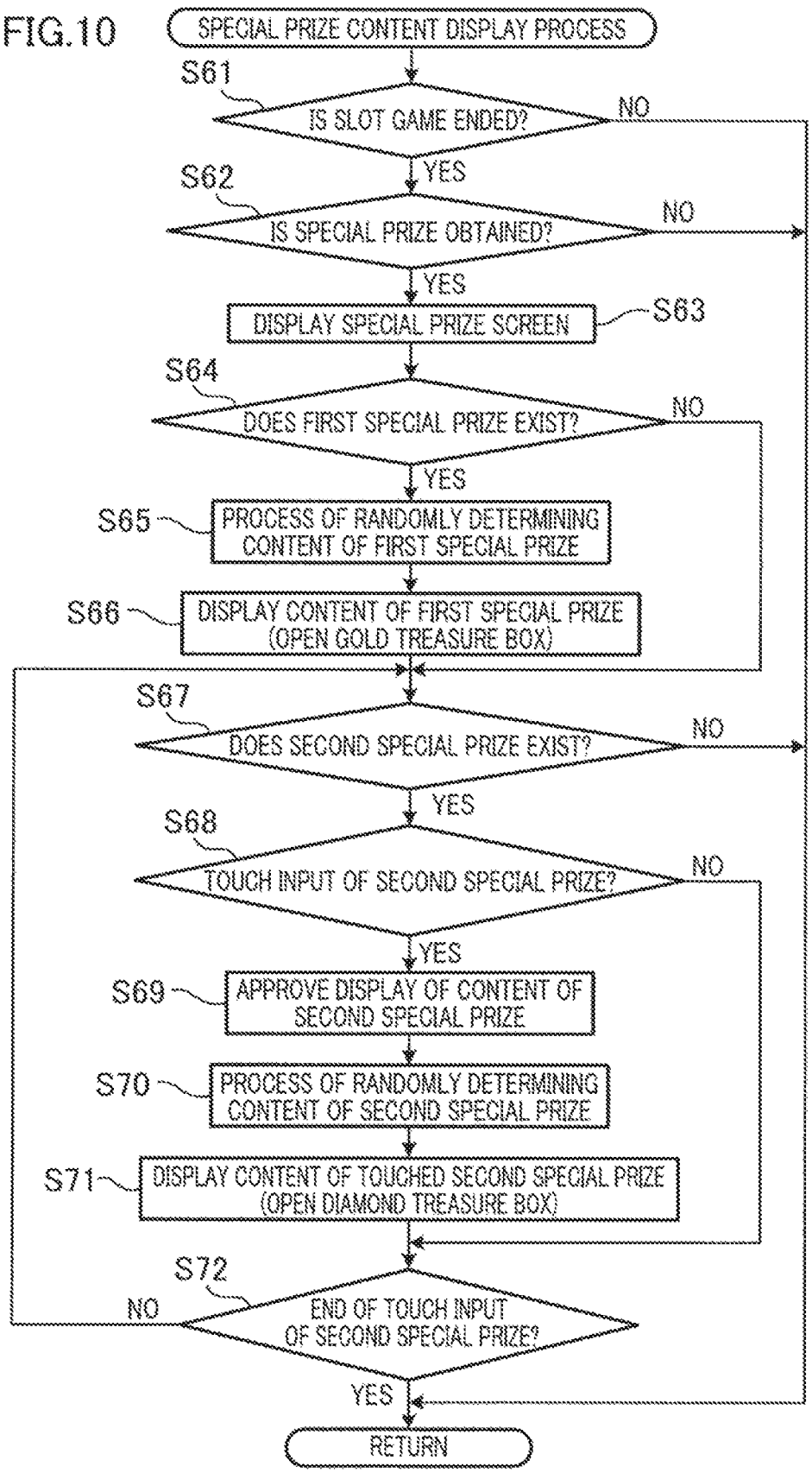

INFORMATION PROCESSING SYSTEM

CROSS-REFERENCE TO RELATED APPLICATION

This application is entitled to the benefit of Japanese Patent Application No. 2017-187123 filed on Sep. 27, 2017.

BACKGROUND OF THE INVENTION

1. Field of the Invention

The present invention relates to an information processing system.

2. Description of Related Art

Traditionally, there has been a structure in which a plurality of gaming terminals are connected via a server, and cooperation amongst the gaming terminals progresses a game. For example, the specification of U.S. Pat. No. 8,636,593 discloses a structure including a plurality of gaming terminals and a plurality of upper displays forming a single common effect display screen, wherein whether or not a common game is run is determined when each gaming terminal starts an independent special game, and an effect is performed in a gaming terminal only when the common game is not run.

Cooperation amongst the gaming terminals to progress the game has been traditionally considered as to be important to enhance players' interest in the game and the value of the gaming machine. However, running a common game on a plurality of gaming terminals is not sufficient for the cooperation amongst the gaming terminals.

BRIEF SUMMARY OF THE INVENTION

An object of the present invention is to provide an information processing system which is able to facilitate cooperation amongst information processors.

The present invention relates to an information processing system including: information processors configured to run a game; and a server connected to the information processors to be able to communicate with the information processors and configured to receive results of the game from the information processors.

The server includes: a processing unit configured to calculate points corresponding to a particular prize, when a result of the game received from at least one of the information processors is the particular prize; and a memory configured to accumulatively store the points calculated by the processing unit. The processing unit sends a special prize to the at least one of the information processors when the number of the points stored in the memory for the at least one of the information processors is equal to or larger than a predetermined number.

According to the arrangement above, because game results of plural information processors are reflected to awarding of a special prize, information processors are encouraged to cooperate to improve the possibility of obtaining the special prize.

The information processor of the present invention may include: a communication apparatus which is configured to display, on a game screen, an ID image specifying each of the information processors belonging to the same group and to be able to exchange data with the server; a display configured to display images; and a controller which is programmed to display the game screen and the ID image on the display and to execute a process of sending a game result to the server.

According to the arrangement above, as the ID image specifying each information processor is displayed on the display, it is possible to facilitate the cooperation between the information processors.

The processing unit of the present invention may be configured to calculate the points for each of types of the particular prize.

According to the arrangement above, the possibility of awarding of the special prize becomes complex because points are calculated depending on which type of the particular prize is awarded as a game result.

The information processor of the present invention may display a special prize notice image giving notice of awarding of the special prize on the display, and may switch this special prize notice image to a special prize awarding image indicating the content of the special prize, when a predetermined condition is satisfied.

According to the arrangement above, player's expectation on the special prize is enhanced, as the awarding of the special prize is noticed by the special prize notice image and the special prize is actually awarded when the special prize notice image is switched to the special prize awarding image.

The information processor of the present invention may include a touch panel provided on the entirety of the display to receive an input from the player, and may be arranged so that the predetermined condition is established when a special prize image on the touch panel is pressed by the player.

According to the arrangement above, player's awareness on the special prize is enhanced as switching from the special prize notice image to the special prize awarding image is performed by the player.

BRIEF DESCRIPTION OF THE DRAWINGS

FIG. 10 is a flowchart of a special prize content display process.

DETAILED DESCRIPTION OF THE PREFERRED EMBODIMENT

An information processor of the present invention will be described with reference to figures.

(Information Processing System: Outline)

Figure 1:
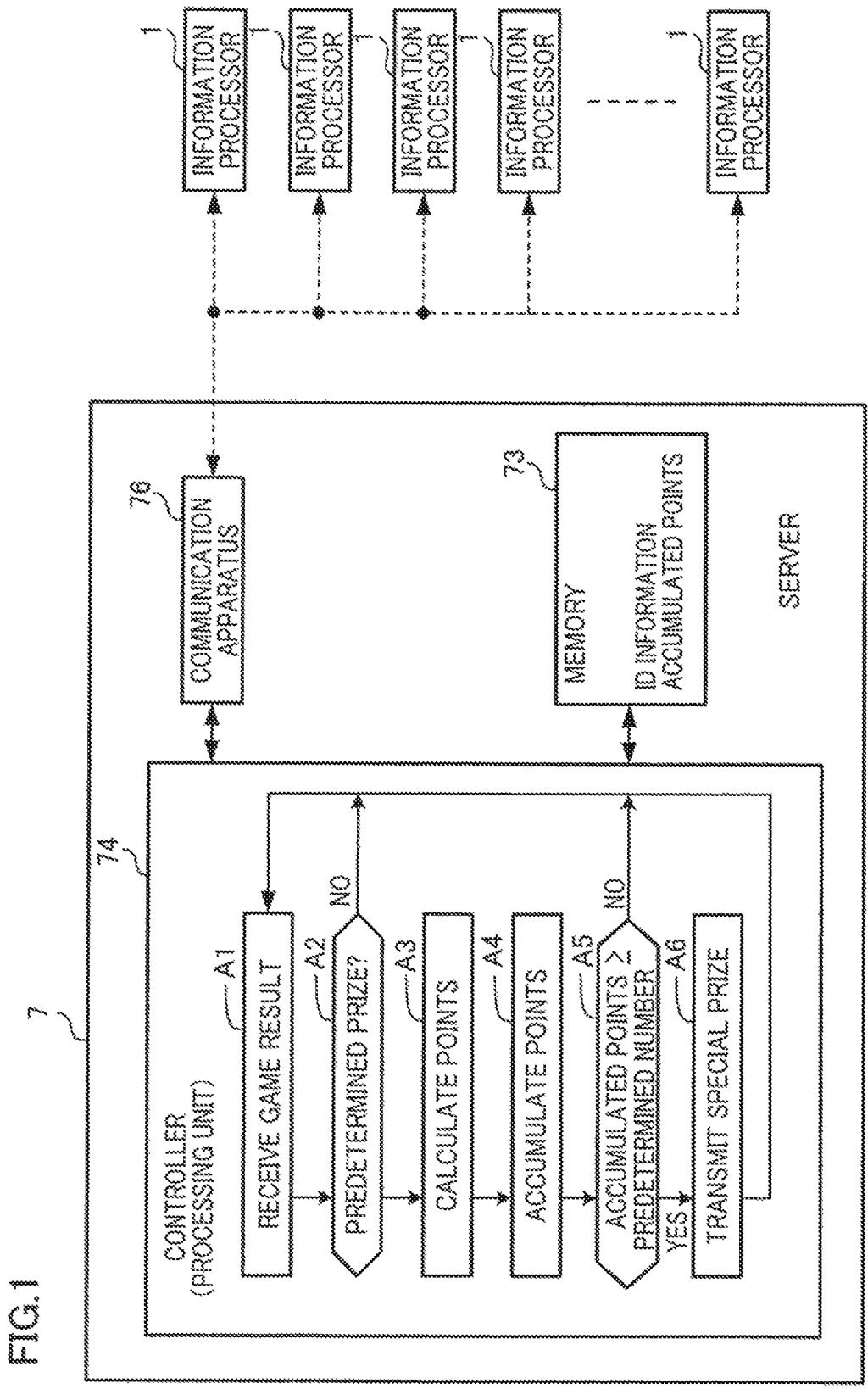
FIG. 1 is an explanatory diagram showing a schematic structure of an information processing system.

As shown in FIG. 1, an information processing system includes information processors 1 configured to run a game and a server 7 connected to these information processors 1 to be able to communicate therewith and configured to receive game results from the information processors 1.

The server 7 includes a controller 74 (processing unit) which is configured to calculate points corresponding to a particular prize (A3) when a game result received from an information processor 1 (A1) is the particular prize (YES in A2) and a memory 73 which is configured to accumulatively store the points calculated by the controller 74. The server 7 further includes a communication apparatus 76. When the number of the points stored in the memory 73 is equal to or larger than a predetermined number (YES in A5), the controller 74 sends a special prize to the information processors 1 via the communication apparatus 76 (A6).

The controller 74 may calculate points for each of types of the particular prize. In this case, the possibility of awarding of the special prize becomes complex because points are calculated depending on which type of the particular prize is awarded as a game result.

Each information processor 1, which is configured to display, on a game screen, an ID image specifying each of the information processors belonging to the same group, includes: a communication apparatus configured to enable data communication with the server 7; a display configured to display images; and a controller which is programmed to execute a process of displaying the game screen and the ID image on the display and running the game and a process of sending a game result to the server. The information processor 1 will be detailed later. As the ID image specifying each information processor 1 is displayed on the display, it is possible to facilitate the cooperation amongst the information processors 1.

The information processor 1 may display a special prize notice image giving notice of awarding of the special prize on the display, and may switch this special prize notice image to a special prize awarding image indicating the content of the special prize, when a predetermined condition is satisfied. According to this arrangement, player's expectation on the special prize is enhanced, as the awarding of the special prize is noticed by the special prize notice image and the special prize is actually awarded when the special prize notice image is switched to the special prize awarding image.

The information processor 1 may include a touch panel provided on the entirety of the display to receive an input from the player, and may be arranged so that the predetermined condition is established when a special prize image on the touch panel is pressed by the player. According to this arrangement, player's awareness on the special prize is enhanced as the switching from the special prize notice image to the special prize awarding image is performed by the player.

Each of the server 7 and the information processor 1 described above may be a mobile device or a desktop device. Examples of the mobile server 7 and the mobile information processor 1 include mobile information devices such as a portable computer, a laptop computer, a note PC, a tablet PC, a handheld PC, a PDA (Personal Data Assistant), and a smartphone. Examples of the desktop server 7 and the desktop information processor 1 include a desktop personal computer and a gaming machine.

(Information Processor 1: Specific Example)

An example of the information processor 1 used in the information processing system will be specifically described. While the descriptions below deal with a case where a slot game in which a game result is obtained based on symbols of video reels after being varied and stopped is run, the disclosure is not limited to this.

(Information Processor 1: Specific Example: Electrical Structure)

Figure 2:
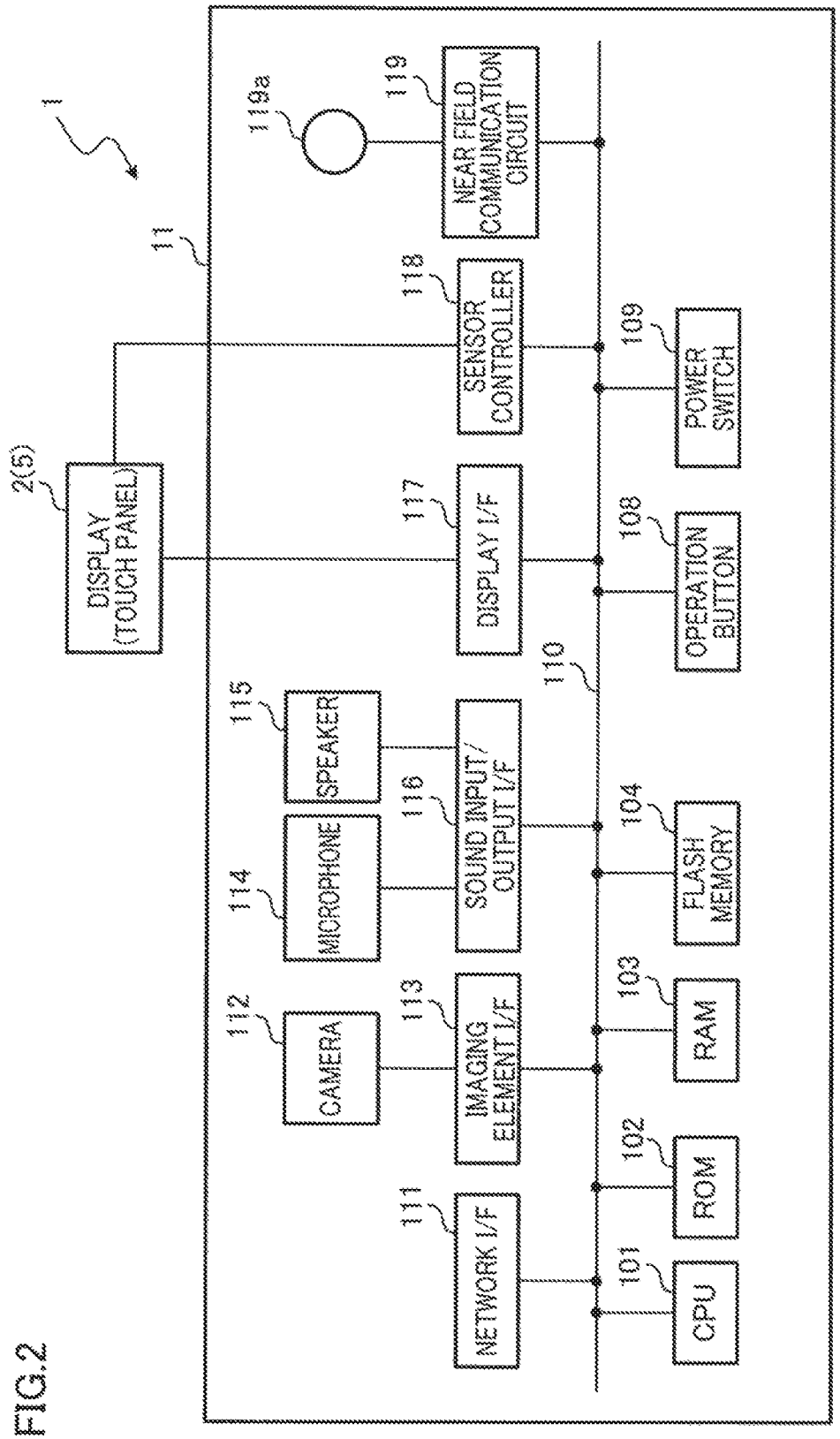
FIG. 2 is an electrical block diagram of an information processor.

As shown in FIG. 2, the information processor 1 includes, in a housing 11, a CPU 101, a ROM 102, a RAM 103, a flash memory 104, an operation button 108, a power switch 109, a bus line 110, a network I/F 111, a camera 112, an imaging element I/F 113, a microphone 114, a speaker 115, a sound input/output I/F 116, a display I/F 117, a sensor controller 118, a near field communication circuit 119, and an antenna 119a of the near field communication circuit 119.

The CPU (Central Processing Unit) 101 controls the entire information processor 1. The ROM (Read Only Memory) 102 stores programs used for driving the CPU 101, such as an IPL (Initial Program Loader).

The RAM (Random Access Memory) 103 is used as a work area of the CPU 101. The flash memory 104 stores a program for communication and plural sets of data such as image data and sound data. The operation button 108 is used for, for example, initial setting of the information processor 1. The power switch 109 is used for turning on/off the power source of the information processor 1.

The network I/F (Interface) 111 is an interface for performing data communication by utilizing a communication network such as the Internet. The information processor 1 is connected to the server 7 shown in FIG. 1 via a network I/F 111 to be able to communicate therewith. The camera 112 is a built-in image capturing means which captures an image of an object to obtain image data under the control of the CPU 101. The imaging element I/F 113 is a circuit for controlling the camera 112. The microphone 114 is a built-in sound collection means to which sound is input. The sound input/output I/F 116 is a circuit for processing input and output of a sound signal between the microphone 114 and the speaker 115 under the control of the CPU 101. The display I/F 117 is a circuit for sending image data to the display 2 under the control of the CPU 101. The display 2 is provided on the front surface of the housing 11. The sensor controller 118 is a circuit for receiving an input from the touch panel 5 of the display 2. The near field communication circuit 119 is a communication circuit based on NFC (Near Field Communication) (Registered Trademark), Bluetooth (Registered Trademark), or the like. The bus line 110 is an address bus, a data bus, or the like for electrically connecting the components such as the CPU 101.

(Information Processor 1: Specific Example: Slot Game)

Figure 3:
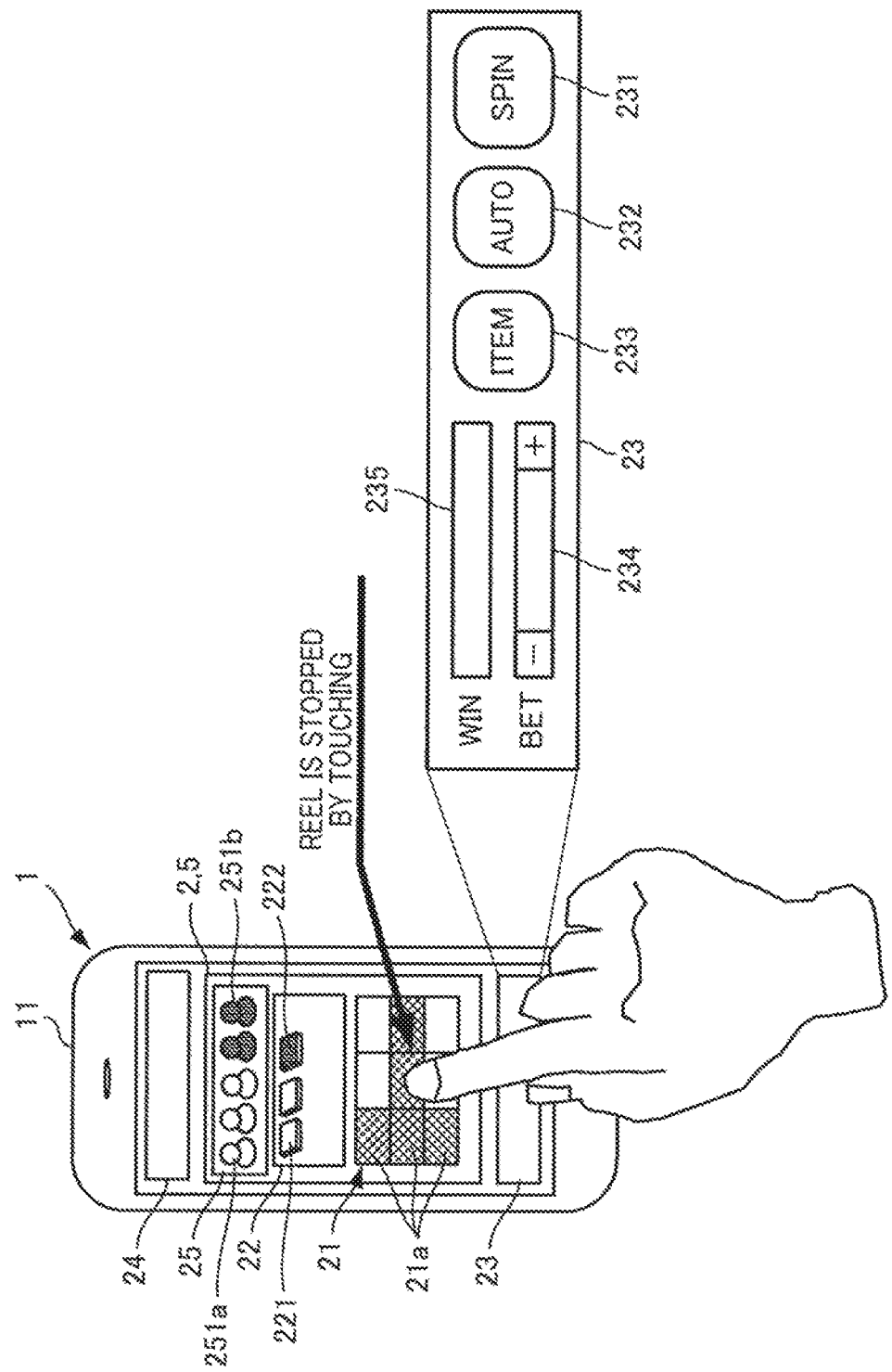
FIG. 3 illustrates image display on the information processor.

As shown in FIG. 3, the information processor 1 which is a gaming machine running the slot game displays a slot game screen on the display 2. The slot game screen includes a game area 21 where symbol display areas 21a are displayed to form plural rows and columns, an effect area 22 where moving images and still images such as game characters are displayed in accordance with the slot game, an operation area 23 which is operated by the player to progress the game, and a game information display area 24 which displays game contents and game information. The operation area 23 includes a spin button 231, an AUTO button 232, an ITEM button 233, a bet button 234, and a WIN display portion 235, which are images.

On the entire surface of the display 2, a touch panel 5 which allows the game screen to be viewable from the outside is provided. The touch panel 5 makes it possible to detect the coordinates of a part touched by a player's finger or the like. With this arrangement, for example, the slot game (unit game) is executed once, as the image of the spin button 231 is pressed. Furthermore, the slot game is serially executed plural times as the image of the AUTO button 232 is pressed.

(Information Processor 1: Specific Example: Slot Game: Definitions)

The slot game of the present embodiment encompasses a base game and a bonus game. The "base game" is a game in which plural symbols are displayed (arranged) by being varied and then stopped in the game area 21, and includes a normal game. A state in which a symbol is displayed after being varied and stopped in the game area 21 is termed "rearrangement". As a bonus game, the free game is executed at least once in the slot game. The slot game may include a process of executing a free game where symbols are rearranged on condition that the payout rate is higher than the payout rate in the normal game and a bonus payout is awarded in accordance with the rearranged symbols.

A gaming value which is awarded when a prize is established as a result of a game result is a coin, paper money, or electrically valuable information corresponding to these. Note that the gaming value in the present invention is not particularly limited. Examples of the gaming value include game media such as medals, tokens, electronic money, tickets, and the like. A ticket is not particularly limited, and a barcoded ticket may be adopted for example. Alternatively, the gaming value may be a game point not including valuable information.

The free game is a game which is executable with a smaller amount of gaming values bet than in the normal game. Note that "bet of smaller amounts of gaming values" encompasses a bet of zero gaming value. The "free game" therefore may be a game runnable without a bet of a gaming value, which free game awards an amount of gaming values based on symbols rearranged. In other words, the "free game" may be a game which is started without consumption of a gaming value. To the contrary, the "normal game" is a game runnable on condition that a gaming value is bet, which normal game awards an amount of gaming value based on the symbols rearranged. In other words, the "normal game" is a game which starts with consumption of a gaming value.

The "unit game" is a series of operations from the start of the receiving of a bet to a state in which an award can be established. To put it differently, the unit game includes a single bet time for receiving a bet, a single game time of rearranging stopped symbols, and a single payout time of a payout process of awarding a payout.

A state in which a symbol is displayed after being varied and stopped in the game area 21 is termed "rearrangement". To put it differently, the term "rearrangement" indicates that the symbols are rearranged after the arrangement of the symbols is dismissed. The term "arrangement" indicates a state in which the symbols are visually recognizable by an external player.

(Information Processing System: Friend-Up Function)

A slot game screen on which the slot game is run includes a friend display area 25. The friend display area 25 displays an icon image 251a of a friend and an icon image 251b of a non-friend. The term "friend" indicates a player who operates another information processor 1 and has received a friend request and approved of the request. The term "non-friend" indicates a player who has not received a friend request or has not approved of a fried request. The management of friends is performed by the server 7 shown in FIG. 1. As friend information is exchanged between the server 7 and each information processor 1, image display on the information processor 1 is updated.

An icon image 251a of a friend and an icon image 251b of a non-friend are distinguishable in color so that whether a player is a friend or not is indicated. The "friend" is used for a friend-up function. The friend-up function is a function with which various benefits are obtained thanks to a relation with a friend. For example, an invitation bonus is awarded in reward for invitation of a friend, a gift is provided once in a day to a friend, and a bonus is awarded when a game is played together with a friend.

The friend-up function in the slot game increases the possibility of obtaining a treasure box which is the special prize. For example, when a particular prize which is as good as or better than "BIG WIN" is obtained in the slot game, the number of the accumulated points in a treasure box counter (game counter) in the memory 73 of the server 7 is increased, and the treasure box (special prize) is awarded when the number of the accumulated points becomes equal to or larger than a predetermined number. The "BIG WIN" indicates a winning combination of symbols, with which a payout larger than payouts of normal winning combinations is awarded. On this account, the phrase "as good as or better than "BIG WIN" indicates a winning combination with which a payout is equal to or larger than the payout of the "BIG WIN". While there are three types of winning combinations, namely "MEGA WIN", "GIGA WIN", and "GOD WIN" in the present embodiment, the disclosure is not limited to this arrangement.

A treasure box counter is counted up on account of a prize as good as or better than "BIG WIN", when, in addition to cases where the player of the information processor 1 obtains a prize as good as or better than "BIG WIN", a friend at another information processor 1, whose icon image 251a is displayed in the friend display area 25, obtains a prize as good as or better than "BIG WIN". In this way, relationship between the player at the information processor 1 and a player at another information processor 1 is enhanced by simplified cooperation play.

Figure 4:
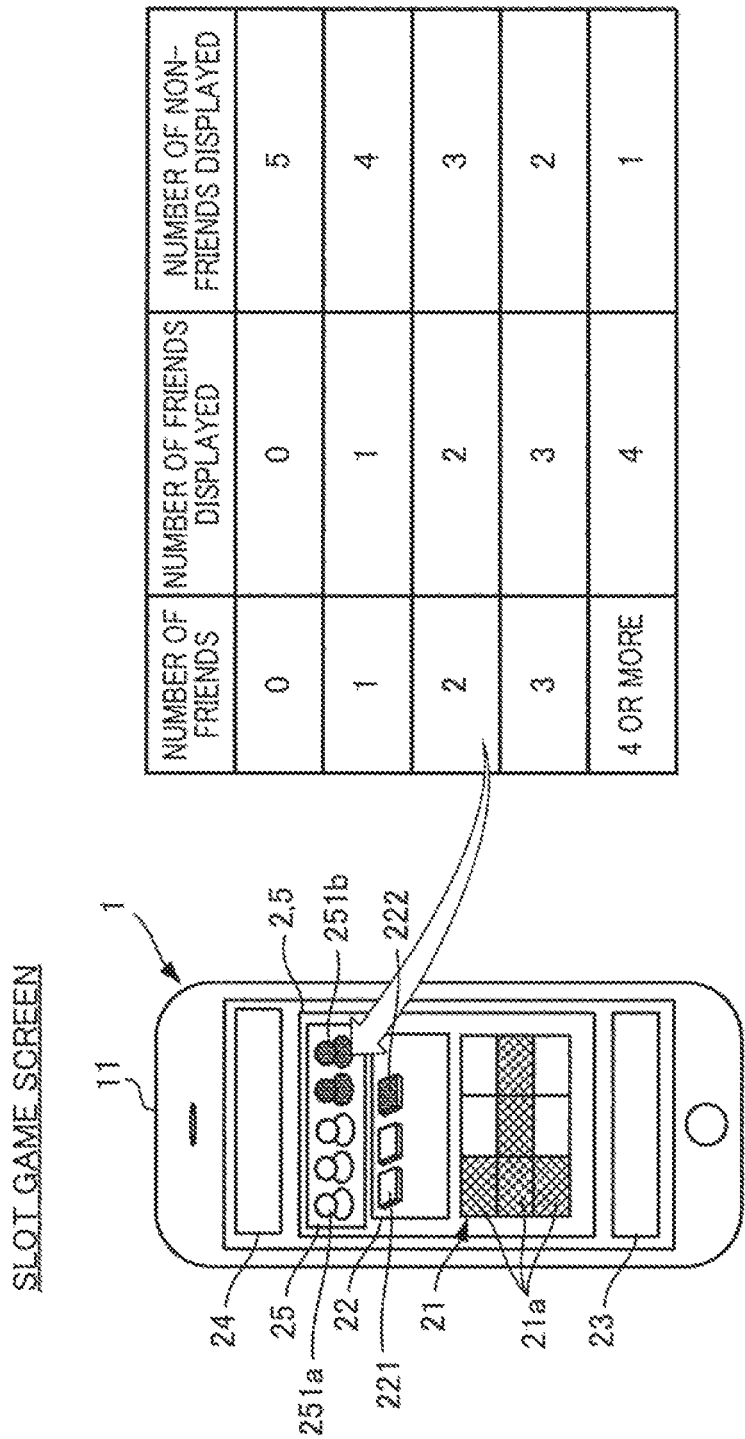
FIG. 4 illustrates image display on the information processor.

As shown in FIG. 4, the friend display area 25 preferentially displays friends who have logged in. The friend display area 25 has display frames for five friends or non-friends. In each display frame, an icon image 251a of a friend or a character image 251 of a non-friend is displayable. In the friend display area 25, four out of five display frames are used for displaying friends who have logged in, and the last one display frame is used for displaying a player who is randomly selected from players who have not logged in for at least three days. On this account, when, for example, the player have three friends, three friends and two non-friends are displayed. When there are four or more friends, most active players (i.e., players who most recently played the slot game) are displayed. Even when there are four or more friends, a point of contact with a non-friend is secured as the last one display frame is provided for a non-friend.

(Information Processing System: Treasure Box Function)

The server 7 and the information processor 1 exert a treasure box function in the slot game. With the treasure box function, when a result of the slot game is a particular prize such as "BIG WIN", first points corresponding to the particular prize are added to the game counter and second points corresponding to prize information from another information processor 1 are added to the game counter. The first points and the second points may be different or identical in number.

To be more specific, when a result of the slot game played by the player of the information processor 1 is as good as or better than BIG WIN, i.e., when one of BIG WIN, MEGA WIN, GIGA WIN, and GOD WIN is obtained as the particular prize, first points corresponding to the particular prize are added to the treasure box counter (game counter).

The first points are 3 points in case of BIG WIN, 4 points in case of MEGA WIN, 5 points in case of GIGA WIN, or 10 points in case of GOD WIN.

Meanwhile, when a result of the slot game played by a player of another information processor 1 is as good as or better than BIG WIN, i.e., when one of BIG WIN, MEGA WIN, GIGA WIN, and GOD WIN is obtained as the particular prize, second points corresponding to the particular prize are added to the treasure box counter (game counter). The second points are 2 points in case of BIG WIN, 3 points in case of MEGA WIN, 4 points in case of GIGA WIN, or 8 points in case of GOD WIN.

Thereafter, when the accumulation of the first points and the second points accumulated in the game counter reaches 30 points (predetermined number), the type and number of treasure boxes 221 and 222 (special prize) are randomly determined, and treasure box icons (special prize notice images), the number of which has been randomly determined, are displayed in the effect area 22 of the display 2. In this way, the acquisition of the treasure boxes 221 and 222 is notified. The progress of the treasure box counter is inherited to the next execution of the slot game. It should be noted that, while in the present embodiment there are two types of the treasure boxes 221 and 222, the types of the treasure boxes may be randomly selected from two or more types. Furthermore, while in the present embodiment the number of the treasure boxes 221 and 222 (special prize) to be obtained falls within the range of 1 to 3, the number of the treasure boxes may be randomly determined to be a number which is 2 or more.

Figure 5:
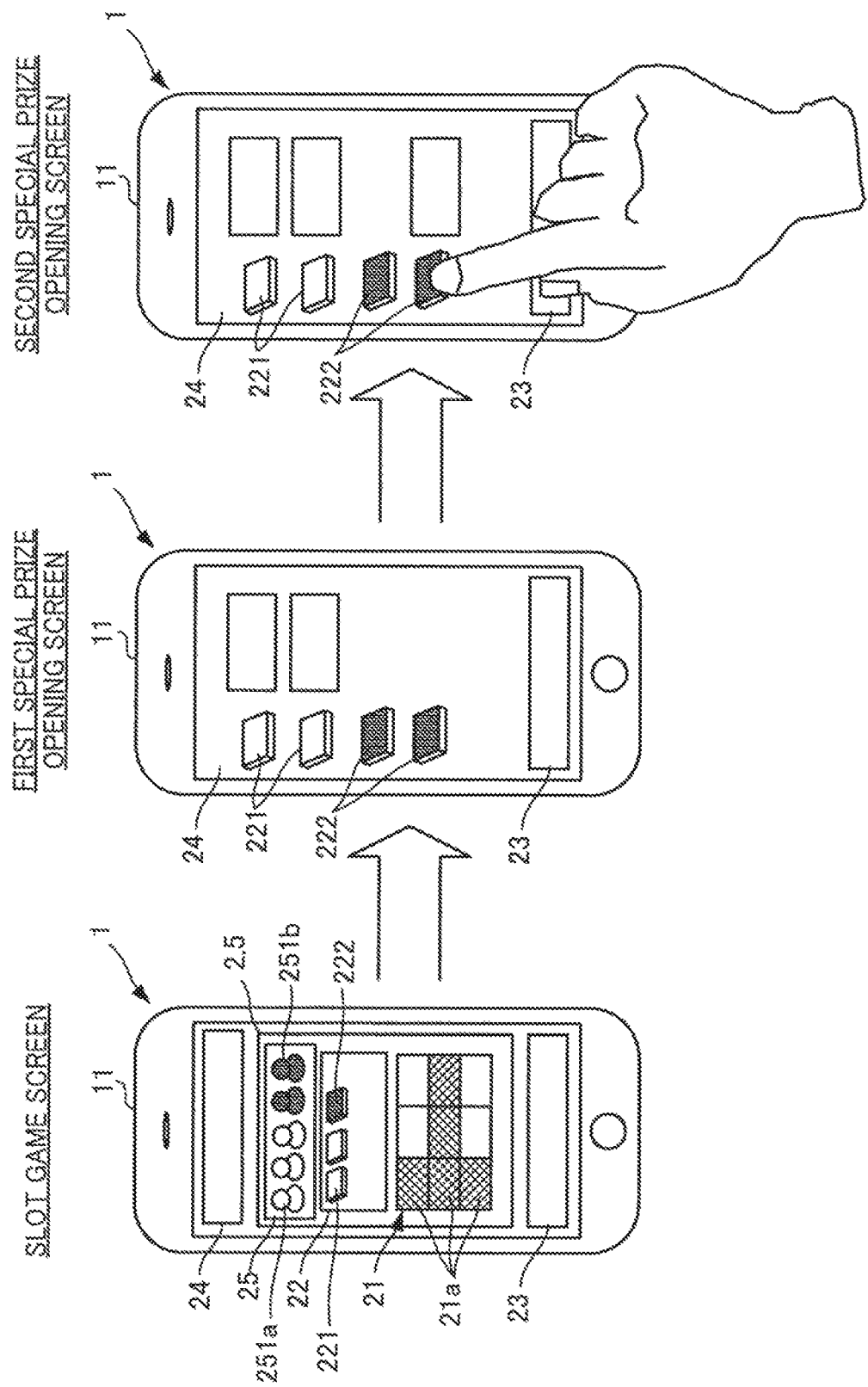
FIG. 5 illustrates image display on the information processor.

As shown in FIG. 5, as the treasure boxes 221 and 222, there are two types, namely a gold treasure box 221 and a diamond treasure box 222. The gold treasure boxes 221 are serially opened and the contents are displayed (special prize awarding image) in a result screen (special prize image) which is displayed at the end of the slot game. The diamond treasure boxes 222 are locked. In the result screen, when a non-friend icon image 251*b* is pressed, whether to open each diamond treasure box 222 with the consumption of a gem is asked before opening the box, and the diamond treasure box 222 is opened after the approval by the player. As the treasure box 222 is opened, the content is displayed (special prize awarding image). When the application program including the slot game is terminated before the treasure boxes 221 and 222 are opened, a result screen is displayed at the next activation.

Figure 6:
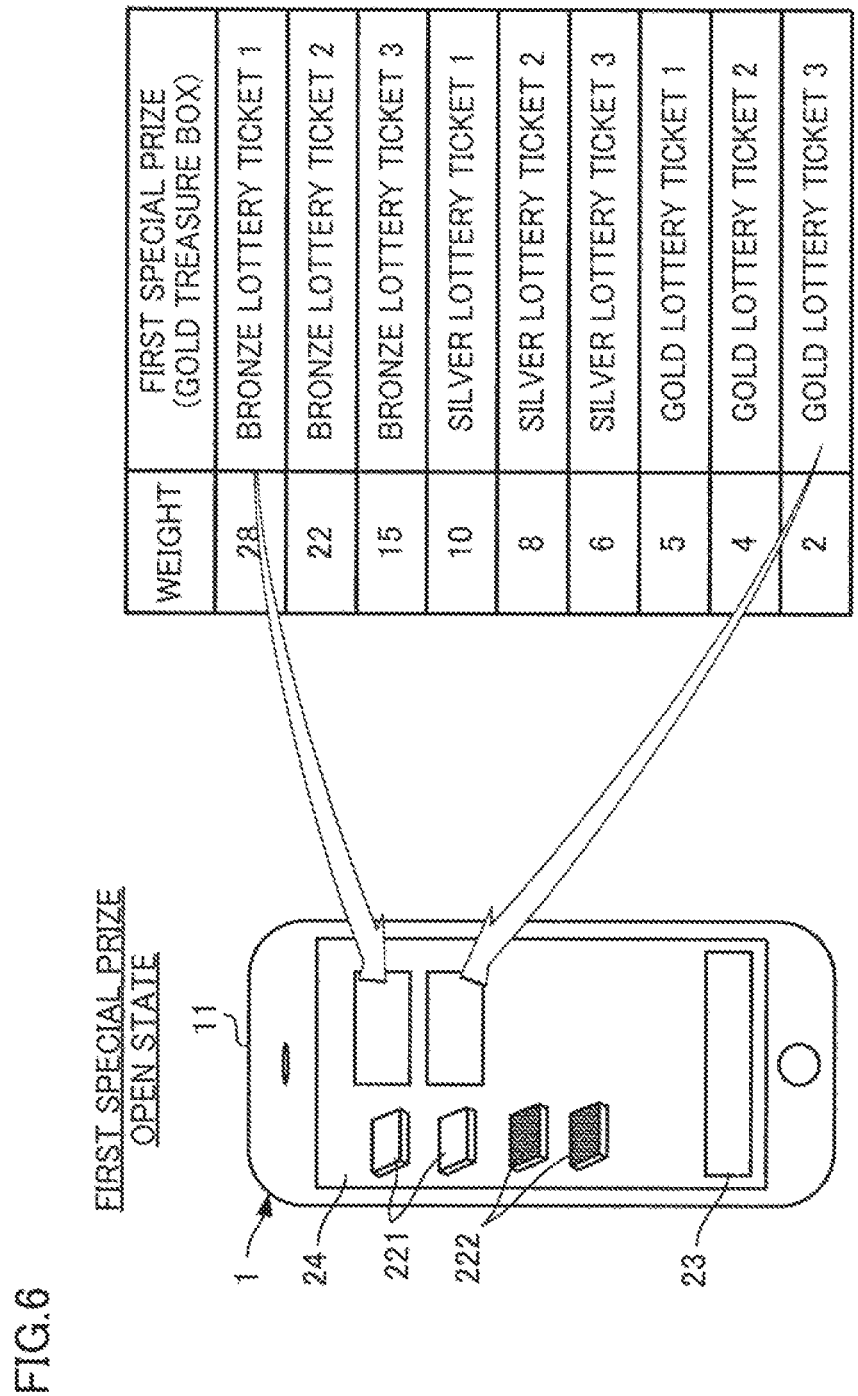
FIG. 6 illustrates image display on the information processor.
Figure 7:
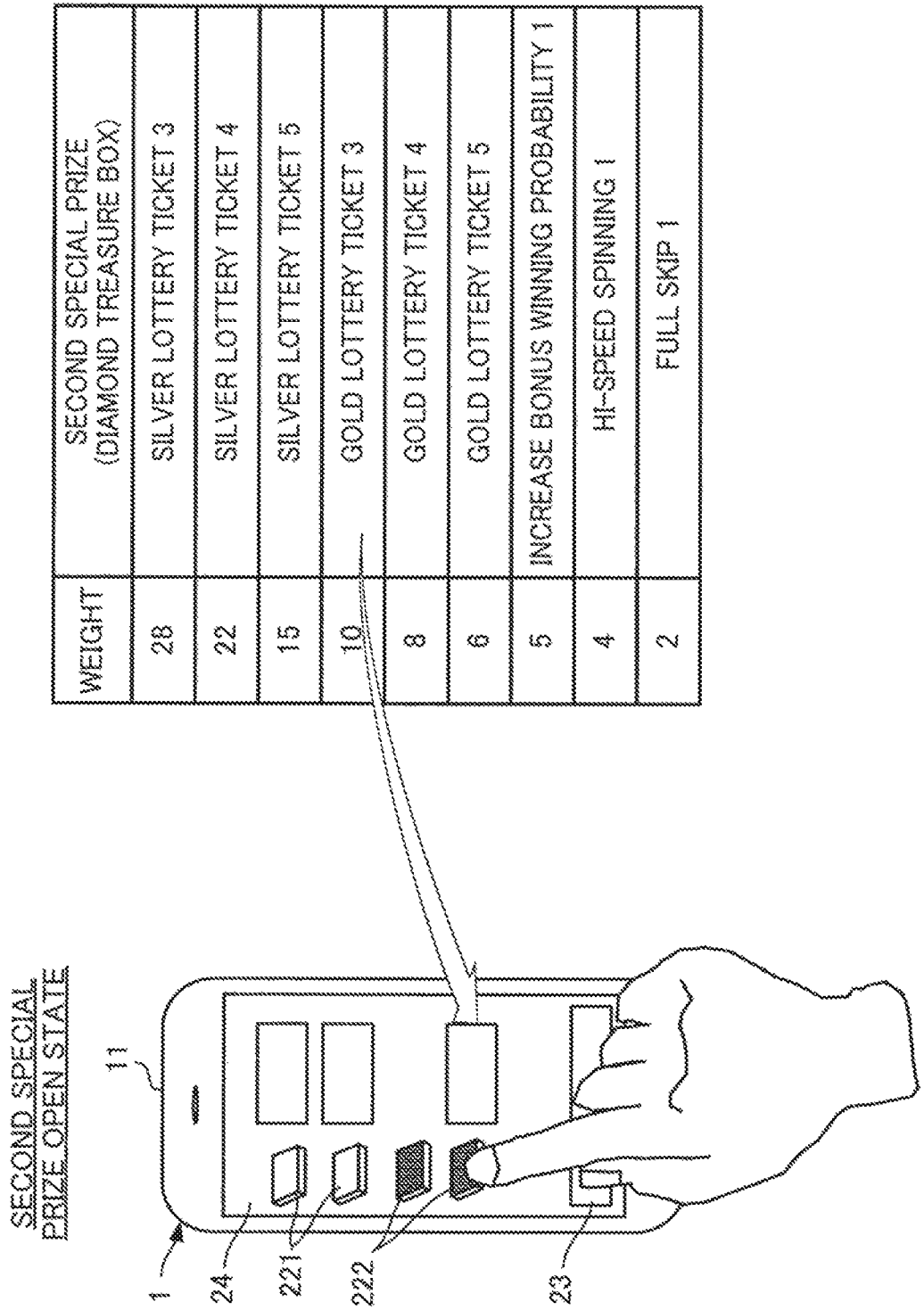
FIG. 7 illustrates image display on the information processor.

As shown in FIG. 6 and FIG. 7, the contents of the treasure boxes 221 and 222 are randomly determined based on the weights in a list of prizes. The weights are arranged so that, the higher a user level is, the more likely the content is associated with a small weight. The "user level" indicates the total bet amount used in a game of an application program including the slot game. For example, when the weight is "28" in the gold treasure box 221, one bronze lottery ticket is obtained. When the weight is "2", three gold lottery tickets are obtained. When the weight is "10", in the diamond treasure box 222, three gold lottery tickets are obtained.

(Information Processing System: Slot Game in Information Processor 1)

Figure 8:
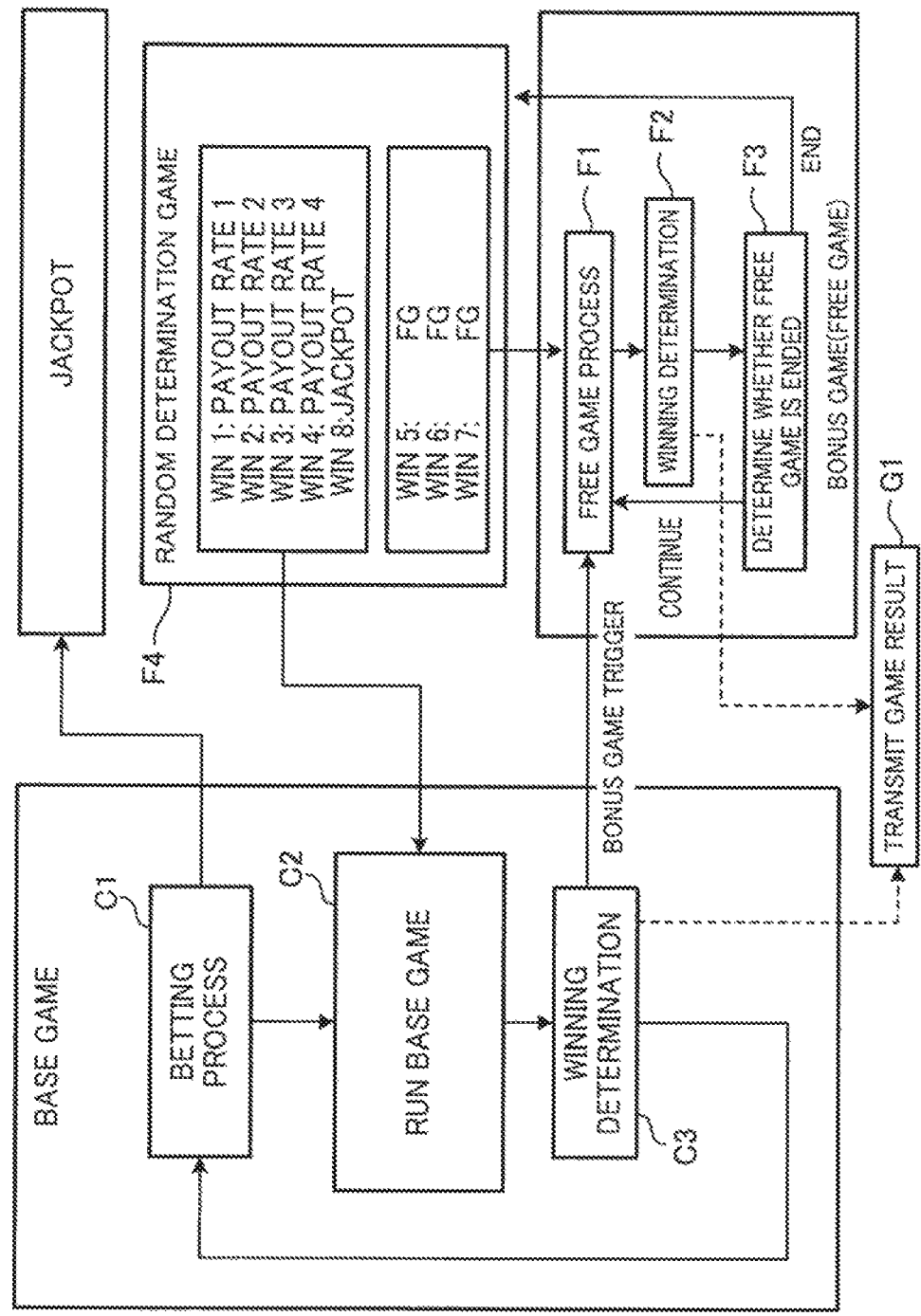
FIG. 8 illustrates a game content.

FIG. 8 shows the shift of the state in the information processor 1 which is a gaming machine. To be more specific, the figure shows the shift between a base game mode, a bonus game mode (free game), and a random determination game mode. The base game mode is a game state during the normal game, whereas the bonus game mode is equivalent to a game state in the free game.

The information processor 1 has three game modes, namely the base game mode, the bonus game mode, and the random determination game mode. The information processor 1 shifts to the bonus game mode when the unit game is run in the base game mode and a bonus trigger condition is satisfied in the base game mode. The trigger of the bonus game is, for example, a condition in which three or more bonus symbols consecutively appear (are rearranged) from the first reel. The trigger of the bonus game may be another condition.

The base game mode is specifically described. In the game area 21 displayed on the display 2 shown in FIG. 3, symbols for the slot game are rearrangeable on the video reels with three rows and three columns. In a betting process (C1), a bet amount is selected by the player. The bet amount is, for example, selected from numbers such as 1, 2, 3, 5, and 10 by operating the bet button 234. The resource generated by accumulating parts of bet amounts is termed jackpot.

Thereafter, as the symbols are rearranged by varying (scroll-moving) and stopping (scroll-stop) the video reels, whether winning is achieved is determined (C2). Then win determination is performed based on the state of the rearranged symbols (C3). For example, the bonus game trigger is won when the bonus symbols are consecutively rearranged from the first column area (first reel) to the third column area (third reel). The bonus game trigger is also established when the bonus symbols and a wild symbol which is able to substitute for the bonus symbol are consecutively rearranged. A game result is sent to the server 7 (G1) when one of BIG WIN, MEGA WIN, GIGA WIN, and GOD WIN is obtained as the particular prize in the win determination.

The base game mode shifts to the bonus game mode when the trigger condition of the bonus game is established, and a free game process is executed, to begin with (F1).

In the free game process, free game reel strips used in the free game are determined, and a predetermined number of times of execution of the free game is set. The reel strips for the free game and the number of times of execution of the free game may be randomly chosen from plural selected options.

As the free game is run, win determination is executed (F2). This win determination may be identical with the win determination in the base game (C3). For example, when three or more bonus symbols consecutively appear from the first reel, the trigger condition of the bonus game (free game) is established. A game result is sent to the server 7 (G1) when one of BIG WIN, MEGA WIN, GIGA WIN, and GOD WIN is obtained as the particular prize in the win determination.

Thereafter, whether the execution of the free game ends is determined (F3). If the free game has not ended (i.e., continued), the free game is run for the remaining number of times in F1. When the execution of the free game has ended, the mode shifts to the random determination game (F4).

The random determination game is run such that a random determination game screen is displayed on the display 2. The random determination game screen includes an effect comment screen showing comments such as "Chance to Get Many Coins" and a first winning portion to an eighth winning portion, which are eight win display areas. When one of the first winning portion to the fourth winning portion is selected, the shift to the base game occurs.

The winning portions are associated with prizes including the bonus game. To be more specific, the first winning portion is associated with a prize awarding a payout calculated by multiplying the total payout of the bonus game (in which the free game is executed more than once) executed before the random determination game by one. The second winning portion is associated with a prize awarding a payout calculated by multiplying the above-described total payout by two. The third winning portion is associated with a prize awarding a payout calculated by multiplying the above-described total payout by three. The fourth winning portion is associated with a prize awarding a payout calculated by multiplying the above-described total payout by four. The fifth winning portion is associated with a prize of running a bonus game in which the free game is run five times. The sixth winning portion is associated with a prize of running a bonus game in which the free game is run 10 times. The seventh winning portion is associated with a prize of running a bonus game in which the free game is run 15 times. The eighth winning portion is associated with a prize of jackpot. This jackpot is a payout typically larger than payouts obtained based on combinations of stopped symbols in the base game, and includes a type (progressive jackpot) in which a payout results from accumulation of a part of each bet.

(Information Processing System: Special Prize Awarding Process in Server 7)

Figure 9:
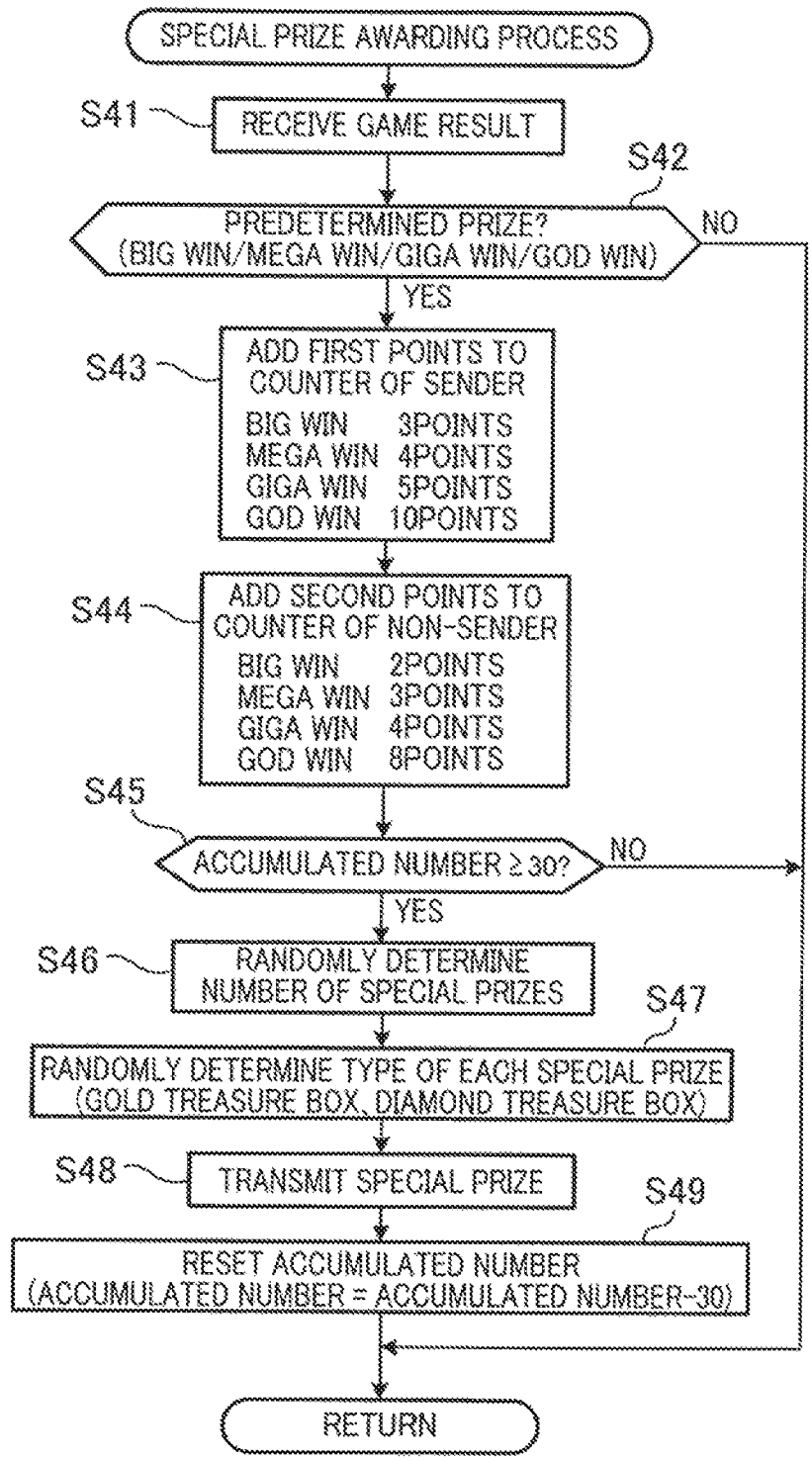
FIG. 9 is a flowchart of a special prize awarding process.

With reference to FIG. 9, the special prize awarding process executed by the server 7 will be described. The special prize awarding process is a process which is executed based on game results of the base game and the bonus game in the slot game.

To begin with, game results of the base game and the bonus game are received from the information processor 1 (S41). Whether the game results correspond to the particular prize which is any of BIG WIN, MEGA WIN, GIGA WIN, and GOD WIN is determined (S42). When the game results correspond to the particular prize (YES in S42), the first points are added to the game counter associated with the information processor 1 which is the sender (S43). To be more specific, 3 points are added in a case of BIG WIN. 4 points are added in a case of MEGA WIN. 5 points are added in a case of GIGA WIN. 10 points are added in a case of GOD WIN.

Thereafter, an information processor 1 which has a friendship relation with the sender information processor 1 and is different from the sender information processor 1 is sampled, and second points are added to the game counter associated with this sampled information processor 1 which is not the sender (S44). To be more specific, 2 points are added in a case of BIG WIN. 3 points are added in a case of MEGA WIN. 4 points are added in a case of GIGA WIN. 8 points are added in a case of GOD WIN.

Subsequently, whether the accumulative number counted by any of the game counters is 30 or more is determined (S45). When the accumulative number is 30 or more in none of the game counters (NO in S45), the process is terminated. Meanwhile, when the accumulative number is 30 or more in any of the game counters (YES in S45), the number of special prizes is randomly determined (S46), and then the type of each special prize is randomly determined. To be more specific, after the number of obtained treasure boxes 221 and 222 (special prizes) is randomly selected from the range of 1 to 3, the type of the treasure box, i.e., gold or diamond, is randomly selected for each of the treasure boxes 221 and 222, the number of which has been randomly determined (S47).

Subsequently, a special prize is awarded to an information processor 1 associated with the game counter in which the accumulative number is 30 or more (S48). To be more specific, treasure box icons (special prize notice images) of the treasure boxes 221 and 222, the number and type of which have been randomly determined, are sent to the information processor 1, and are displayed on the effect area 22 of the display 2 of this information processor 1. Thereafter, the accumulative number is reset by subtracting 30 from the current accumulative number indicated by the game counter (S49), and the process is terminated.

(Information Processing System: Special Prize Content Display Process in Information Processor 1)

With reference to FIG. 10, the special prize content display process executed by the information processor 1 will be described. The special prize content display process is a process which is executed when the end of the slot game including the base game and the bonus game is monitored, and executed mainly on a special prize screen which is a result screen.

To begin with, whether the slot game has been ended is determined (S61). When the slot game has not been ended (NO in S61), the process is terminated. Meanwhile, when the slot game has been ended (YES in S61), whether a special prize has been obtained is determined (S62). When no special prize has been obtained (NO in S62), the process is terminated.

When the special prize has been obtained (YES in S62), the special prize screen which is a result screen is displayed (S63). Thereafter, whether a first special prize which is a gold treasure box has been obtained is determined (S64). When the first special prize has been obtained (YES in S64), the content of the first special prize which is the gold treasure box is randomly determined (S65). Alternatively, the content of the first special prize may be randomly determined in advance when the type of the treasure box is randomly determined in the slot game. Thereafter, the content of the first special prize is displayed as the treasure box is opened (S66).

After the execution of S66 or if the first special prize does not exist (NO in S64), whether a second special prize which is a diamond treasure box has been obtained is determined (S67). When no second special prize has been obtained (NO in S67), the process is terminated. When the second special prize has been obtained (YES in S67), whether a touch input of the second special prize has been done by the player is determined (S68). When the touch input of the second special prize has been done (YES in S68), approval of the display of the content of the second special prize is carried out. To be more specific, the player is asked to determine whether to show the content of the diamond treasure box by opening the lid of the treasure box with the consumption of a gem. When the player's approval is not obtained within a predetermined time, S67 is executed again.

Thereafter, the content of the second special prize is randomly determined, subject to the player's approval (S70). Alternatively, the content of the second special prize may be randomly determined in advance when the type of the treasure box is randomly determined in the slot game. Thereafter, the content of the touched second special prize is displayed as the treasure box is unlocked and opened (S71).

After the execution of S71 or if the touch input of the second special prize is not done (NO in S68), whether the touch input of the second special prize has been ended is determined (S72). In other words, when the touch input of the second special prize is not done during a waiting time which is a predetermined period of time from the start of the execution of S67, it is determined that the touch input has been ended. When the touch input of the second special prize has not been ended (NO in S72), the process is executed again from S67. When the touch input of the second special prize has been ended (NO in S72), the process is terminated.

Embodiments of the present invention thus described above solely serve as specific examples of the present invention, and are not to limit the scope of the present invention. The specific structures and the like are suitably modifiable. Further, the effects described in the embodiments of the present invention described in the above embodiment are no more than examples of preferable effects brought about by the present invention, and the effects of the present invention are not limited to those described hereinabove.

What is claimed is:

1. An information processing system comprising:
    a plurality of information processors configured to execute one or more games; and
    a server connected to the plurality of information processors to be able to communicate with the plurality of information processors and configured to receive results of the one or more games from each the plurality of information processors,
    the server including:
        a processing unit configured to receive points corresponding to a particular prize when a result of the one or more games received from at least one of the plurality of information processors is the particular prize, a number of the points received being different between a first information processor that is a sender of the result of the game and one or more second information processors that are not the sender of the result of the game; and
        a memory including a plurality of game counters each associated with a respective one of the plurality of information processors, the memory configured to accumulatively store the points received by the processing unit in each of the respective plurality of the game counters,
    when the number of the points stored in one of the plurality of game counters associated with a respective one of the plurality of information processors is equal to or larger than a predetermined number, the processing unit sends a special prize to the information processor associated with the game counter storing the number of the points equal to or larger than the predetermined number.

2. The information processing system according to claim 1, wherein, each of the information processors is configured to display, on a game screen, an ID image specifying each of the information processors belonging to a same group, and includes:
    a communication apparatus enabling data communication with the server;
    a display configured to display an image; and
    a controller programmed to execute: a process of displaying the game screen and the ID image on the display and running the game; and a process of sending a result of the game to the server.

3. The information processing system according to claim 1, wherein, the processing unit is configured to calculate the points for each of types of the particular prize.

4. The information processing system according to claim 2, wherein, each of the information processors is configured to display a special prize notice image which gives notice of awarding of the special prize on the display, and to switch the special prize notice image to a special prize awarding image which indicates the content of the special prize, when a predetermined condition is satisfied.

5. The information processing system according to claim 4, wherein, each of the information processors includes a touch panel provided on the entirety of the display to receive an input from a player, and
    the predetermined condition is established when the special prize image on the touch panel is pressed by the player.

6. The information processing system according to claim 1, wherein, in the processing unit, the number of the points in the information processor which is the sender is larger than the number of the points in the information processor which is not the sender.

* * * * *